(12) United States Patent
Yannam et al.

(10) Patent No.: US 12,106,053 B2
(45) Date of Patent: *Oct. 1, 2024

(54) ARTIFICIAL INTELLIGENCE (AI)-POWERED LEGACY SCENARIOS FOR USE WITHIN A MOBILE APPLICATION

(71) Applicant: Bank of America Corporation, Charlotte, NC (US)

(72) Inventors: Ramakrishna R. Yannam, Plano, TX (US); Prejish Thomas, Plano, TX (US); Steven Zhao, Plano, TX (US); Saahithi Chillara, Plano, TX (US); Rajan Jhaveri, Plano, TX (US); Ryan Strug, Plano, TX (US); Kurt R. Schultz, Westlake Village, CA (US); Priyank Shah, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 267 days.

This patent is subject to a terminal disclaimer.

(21) Appl. No.: 17/722,995

(22) Filed: Apr. 18, 2022

(65) Prior Publication Data

US 2023/0334251 A1 Oct. 19, 2023

(51) Int. Cl.
*G06F 40/30* (2020.01)
*G06F 3/0482* (2013.01)
*G06F 40/166* (2020.01)
*G06N 3/08* (2023.01)

(52) U.S. Cl.
CPC ............ *G06F 40/30* (2020.01); *G06F 3/0482* (2013.01); *G06F 40/166* (2020.01); *G06N 3/08* (2013.01)

(58) Field of Classification Search
CPC ...... G06F 40/30; G06F 3/0482; G06F 40/166; G06N 3/08
See application file for complete search history.

(56) References Cited

U.S. PATENT DOCUMENTS

| | | | | |
|---|---|---|---|---|
| 2018/0183740 A1* | 6/2018 | Werdell | .................. | H04W 4/14 |
| 2020/0311120 A1* | 10/2020 | Zhao | ....................... | G06F 18/23 |
| 2020/0364588 A1* | 11/2020 | Knox | ..................... | G06V 40/20 |
| 2022/0198411 A1* | 6/2022 | Jones | ..................... | G06Q 20/42 |
| 2023/0139783 A1* | 5/2023 | Garib | ..................... | G06N 3/044 |
| | | | | 707/769 |

* cited by examiner

*Primary Examiner* — Hai Phan
*Assistant Examiner* — Ian Scott McLean
(74) *Attorney, Agent, or Firm* — Weiss & Arons LLP

(57) ABSTRACT

A system for condensing user communications relating to a topic is provided. The system may include a processor and a non-transitory memory. The processor may: designate a topic of user interest; retrieve legacy communications; and remove duplicative communications. The processor may form a topic-centric training set for a neural network. The topic-centric training set may be based on the legacy communications, legacy intelligence, and the plurality of outcomes and may be delimited by an analysis of the database. The processor may synthesize the neural network using the topic-centric training set in order to assign individual weights to each of a plurality of nodes in the neural network. In response to a selection of the topic of user interest, the processor may generate a plurality of user options based on the neural network. The system may include a display in order to prompt the user to select one of the options.

17 Claims, 13 Drawing Sheets

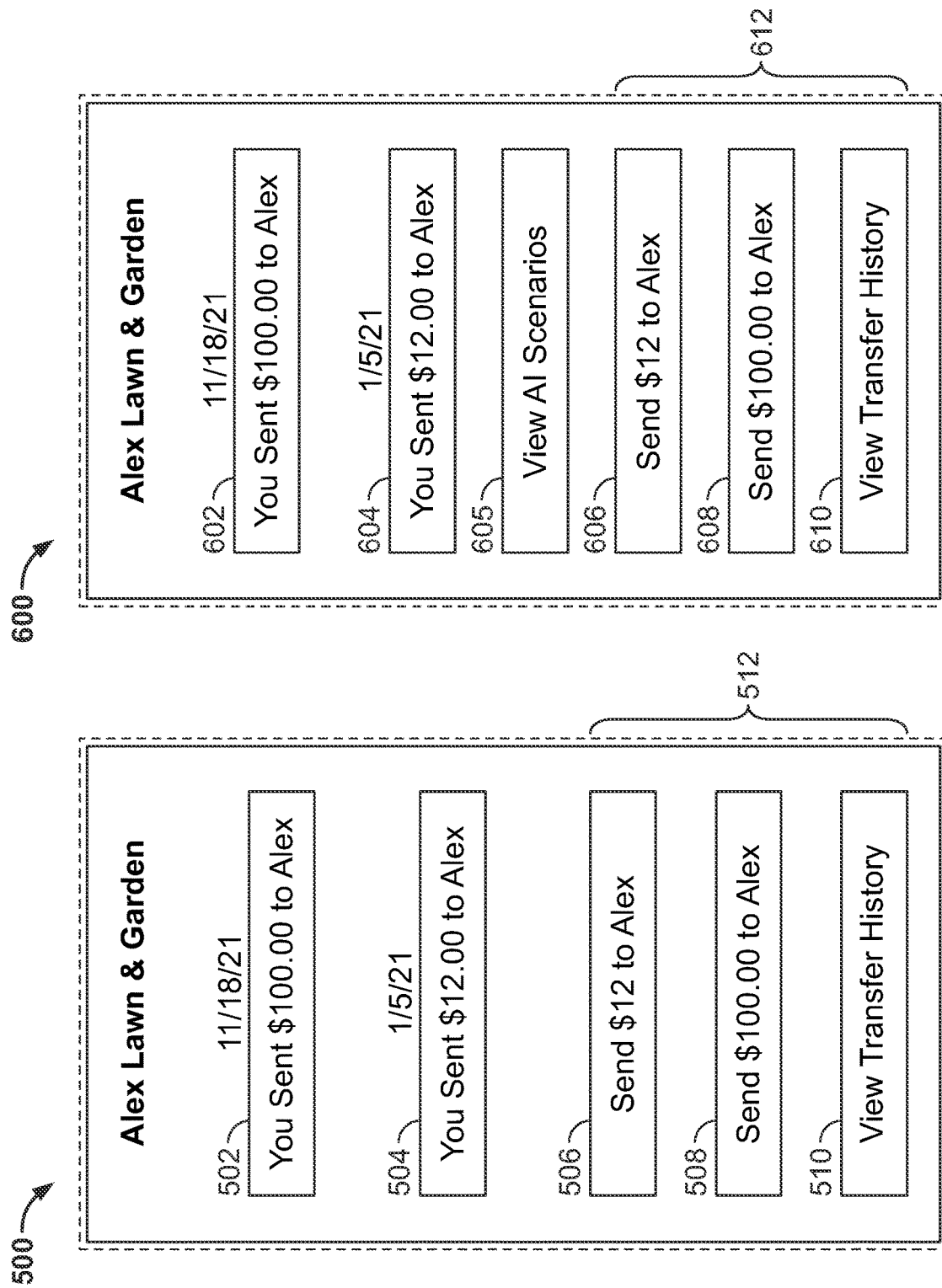

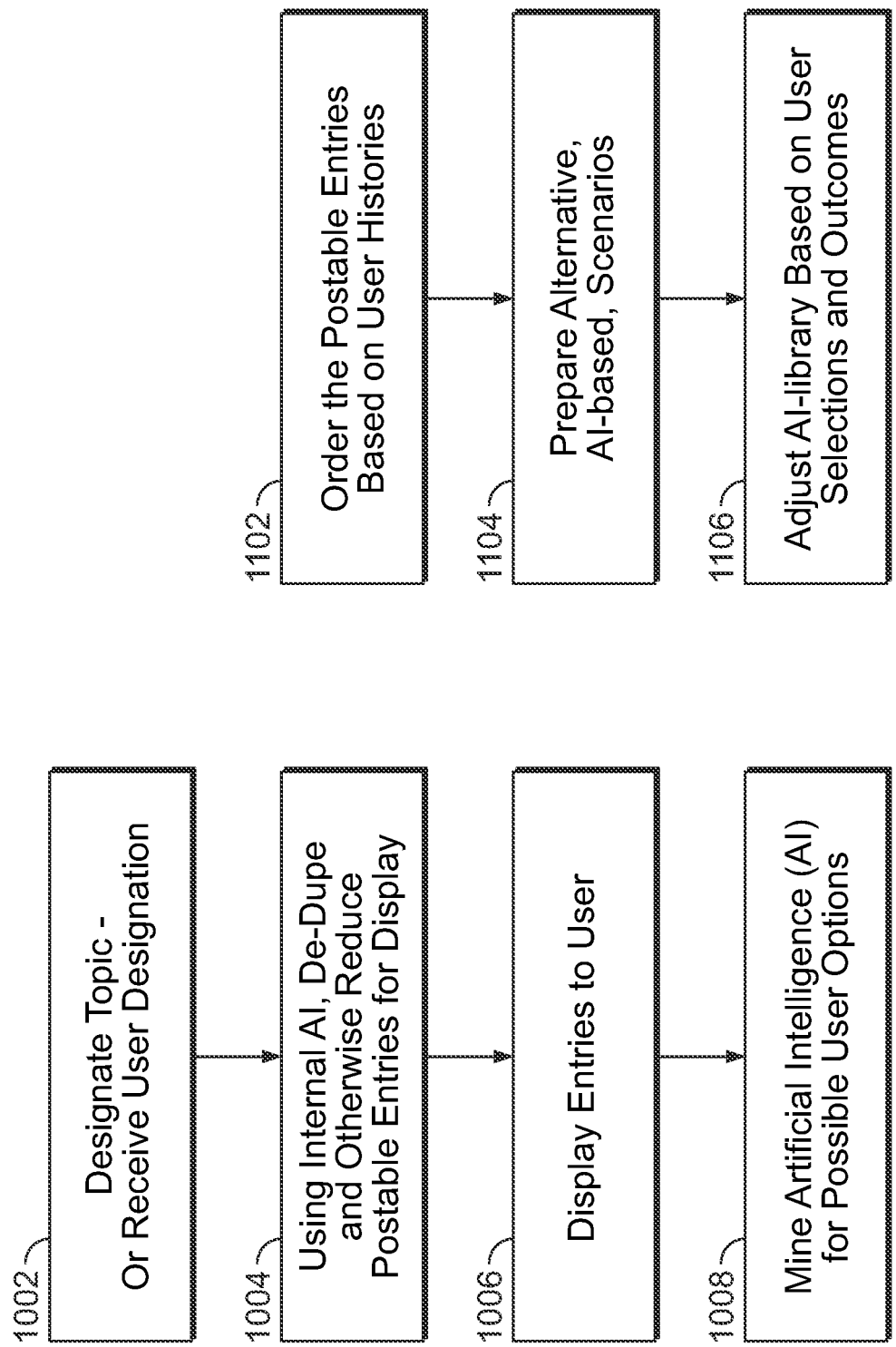

ARTIFICIAL INTELLIGENCE (AI)-POWERED LEGACY SCENARIOS FOR USE WITHIN A MOBILE APPLICATION

FIELD OF TECHNOLOGY

Aspects of the disclosure relate to mobile applications for use with mobile devices.

BACKGROUND OF THE DISCLOSURE

In a typical business setting, a user may receive a high number of electronic communications over time. Often a user may receive a high number of electronic communications during a normal workday. Yet typical mobile applications are not configured to summarize or otherwise provide separate notifications/insights/security alerts/transaction confirmations etc. relating to the electronic communications received.

In addition, even when such information is shown or otherwise indicated to a user, there is often no response to such information.

It would be desirable to summarize or otherwise provide separate notifications/insights/security alerts/transaction confirmations etc. relating to the electronic communications received.

It would be desirable to increase user response to such notifications/insights/security alerts/transaction confirmations etc. relating to the electronic communications received.

It would be yet further desirable to summarize electronic communications received.

It would be still further desirable to contextualize and personalize suggested next steps for a user to take in response to such electronic communications—thereby reducing the load for reviewing and responding to such conversations.

SUMMARY OF THE DISCLOSURE

A method for condensing user communications relating to a first topic is provided. The method is for use with a system. The system includes a processor and a non-transitory memory with instructions stored thereon. The processor may execute the method. The method may include receiving a user designation of a topic of user interest. The method may further include in real-time, retrieving legacy communications regarding the topic. Thereafter, the method may include, in real-time, determining whether duplicative communications are included among the legacy communications and, to the extent that duplicative communications are included in the legacy communications, removing said duplicative communications from the legacy communications. The method may also include, in real-time, retrieving legacy intelligence relating to historical user selections regarding the topic. The method may further include, in real-time, retrieving a plurality of outcomes based on the legacy intelligence.

With respect to the topic of interest, the method may form, in real-time, a topic-centric training set for a neural network. The topic-centric training set can be based on the legacy communications, legacy intelligence, and the plurality of outcomes. The neural network may include a plurality of nodes.

The method may include synthesizing the neural network. The synthesizing may initiate using the topic-centric training set to assign individual weights to each of the plurality of nodes based on the legacy communications, legacy intelligence, and the plurality of outcomes. Thereafter, the method may generate, for display to a user, a plurality of topic-related user options based on the neural network and may prompt the user to select one of the user options.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 5 shows yet another illustrative apparatus in accordance with the principles of the disclosure;

FIG. 6 shows still another illustrative apparatus in accordance with the principles of the disclosure;

FIG. 10 shows an illustrative flow diagram in accordance with the principles of the disclosure;

FIG. 11 shows another illustrative flow diagram in accordance with the principles of the disclosure;

DETAILED DESCRIPTION OF THE DISCLOSURE

Figure 1:
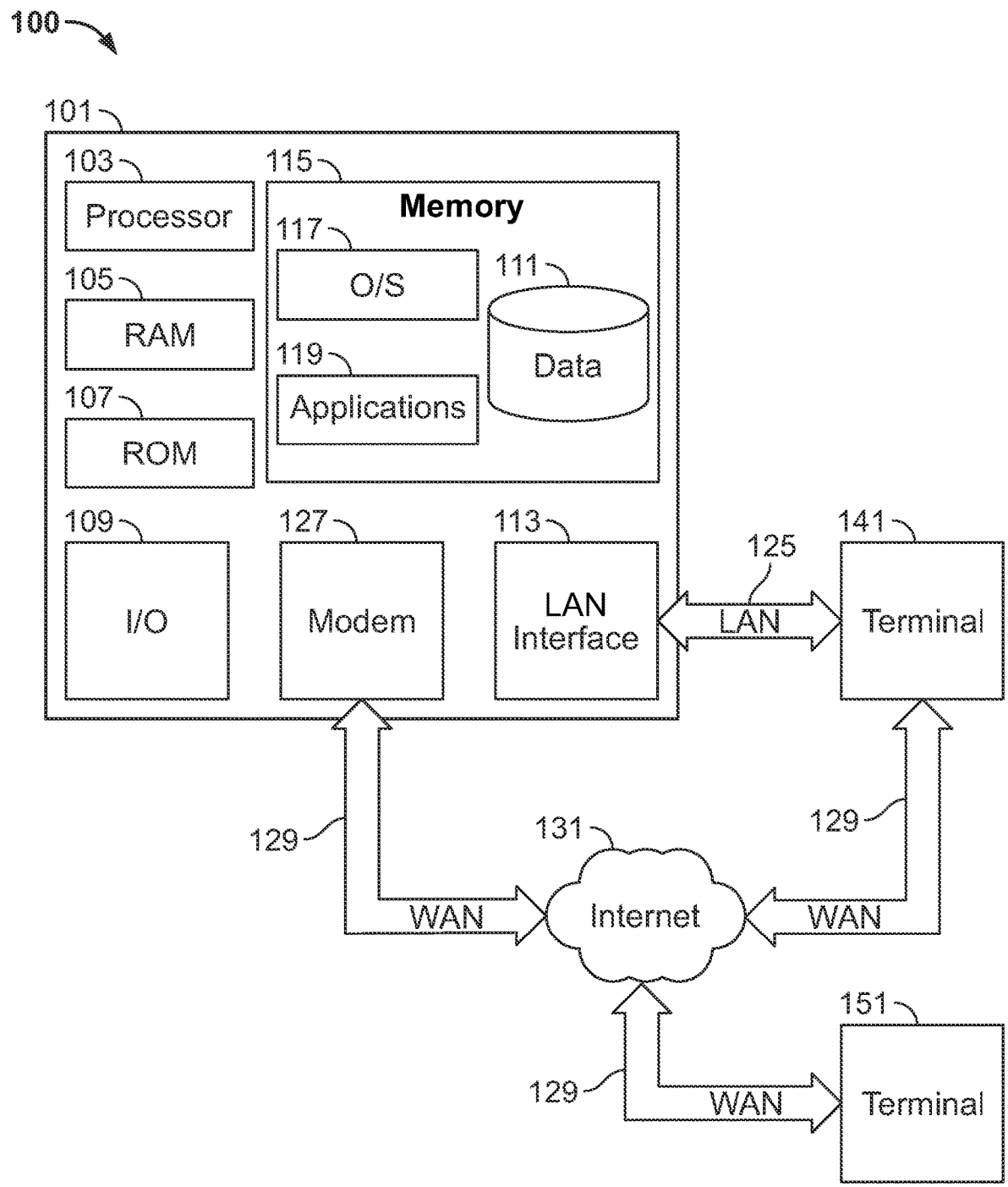
FIG. 1 shows an illustrative block diagram of system that may be configured in accordance with the principles of the disclosure.

A method for condensing user communications relating to a first topic is provided. The method is preferably for use with a system. The system may include a processor and a non-transitory memory with instructions stored thereon. The instructions upon execution by the processor, cause the processor to execute the method. The method may include designating a topic of user interest and retrieving legacy communications regarding the topic. The legacy communications are preferably retrieved from an electronically-stored library of communications. Specifically, the library of communications relate to one or more pre-determined users. The method may preferably remove duplicative communications from retrieved list of legacy communications. For the purposes of this application, duplicative communications may include any communications that do not introduce any non-cumulative information over and above information already derived from other communications sources.

The method may further include retrieving legacy intelligence relating to historical user selections regarding the topic. These user selections may include selections made in response to electronic prompting of the user.

The method may also include retrieving a plurality of outcomes based on the legacy intelligence. The plurality of outcomes may include outcomes subsequent to historical user selections. The plurality of outcomes legacy user selections may include the topic of user interest. These outcomes may preferably be tailored to show direct, substantially direct, or indirect results that flowed from the historical user selections. For example, if user selected a certain course of events in response to a prompt, the outcomes preferably detail the effect that the user selection obtained and the future events that flowed from the events that followed on from initial user prompt.

Part of the method may include forming a training set for a neural network where the neural network provides artificial intelligence (AI). In some embodiments, the training set may specifically relate to a topic of user interest. Forming a topic-centric training set for a neural network may include mining information that relates to legacy user communications, legacy intelligence, and the plurality of outcomes as described above. This information can then provide information for the plurality of nodes that form the neural network.

The topic-centric training set may, in certain embodiments be delimited by an analysis of a relevant database as follows. The database may include legacy user communications, legacy intelligence, and the plurality of outcomes as described above. An analysis may be performed to obtain, for example, the 100 most common nouns in the database. For these databases, the topic-centric training set may mine all communications and other information related thereto. Thereafter, the method may use the topic-centric training set to form a neural network for each of the 100 most common nouns in the database. In certain embodiments, the deriving may reduce the topics of interest found in the database to a suitable pre-determined number of most-occurring topics of interest.

Thereafter, a neural network can be formed for each of the 100 most common nouns and, as a result, can be made available for the user. In addition, because the mined information has been derived in a way that is customized to the user—each of the neural networks can include information that is ranked according to the user's usage patterns and can be tailored for the user.

The formation of the neural network may include synthesizing using the topic-centric training set to assign individual weights to each of the plurality of nodes based on the legacy communications, legacy intelligence, and the plurality of outcomes.

In response to a selection by a user of a topic of user interest, the method may also include generating, for display to a user, a plurality of topic-related user options based on the neural network. These options may preferably have been formed with a priority score associated therewith. The method may then rank, using the priority score, and display the plurality of user options to the user.

The actions of ranking and displaying options to the user may also include prompting the user to select one of the options. Such prompting may include prompting the user to select a scenario indicator in which a plurality of predicted scenarios are displayed.

Such scenario indicators may be provided with a visual indicator. For example, if a user wanted to make a payment on a vehicle, the user may be presented with various payment options. The options may trigger various scenarios. The scenarios may be keyed off various payment eventualities. For example, a payment of 500 dollars may trigger a payment track that will pay off the vehicle in three years, while a payment of 1000 dollars may trigger a payment track that will pay off the vehicle in 1.4 years. However, the user's personal history may indicate that a payment of 1000 dollars many initiate an unsustainable path for the user and, as such, not obtain an optimal payment path. Such paths may be formulated using the neural network and displayed to the user. Such paths may be formed based on the weights attributed to the various nodes which form the neural network. Once a predicted path is generated by the neural network—it can be converted into a visually-indicated path and represented to the user in a display.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology— e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI) as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
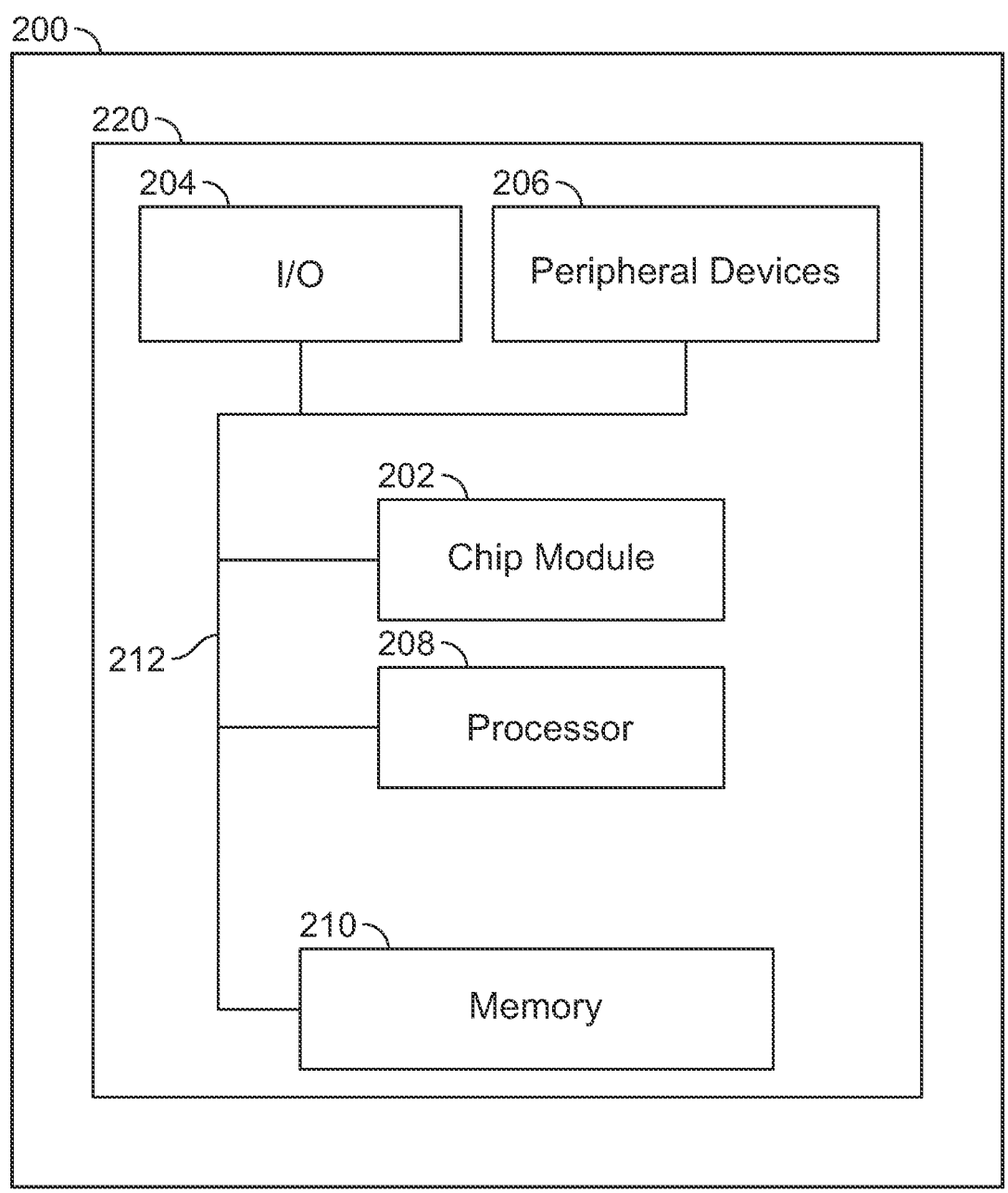
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
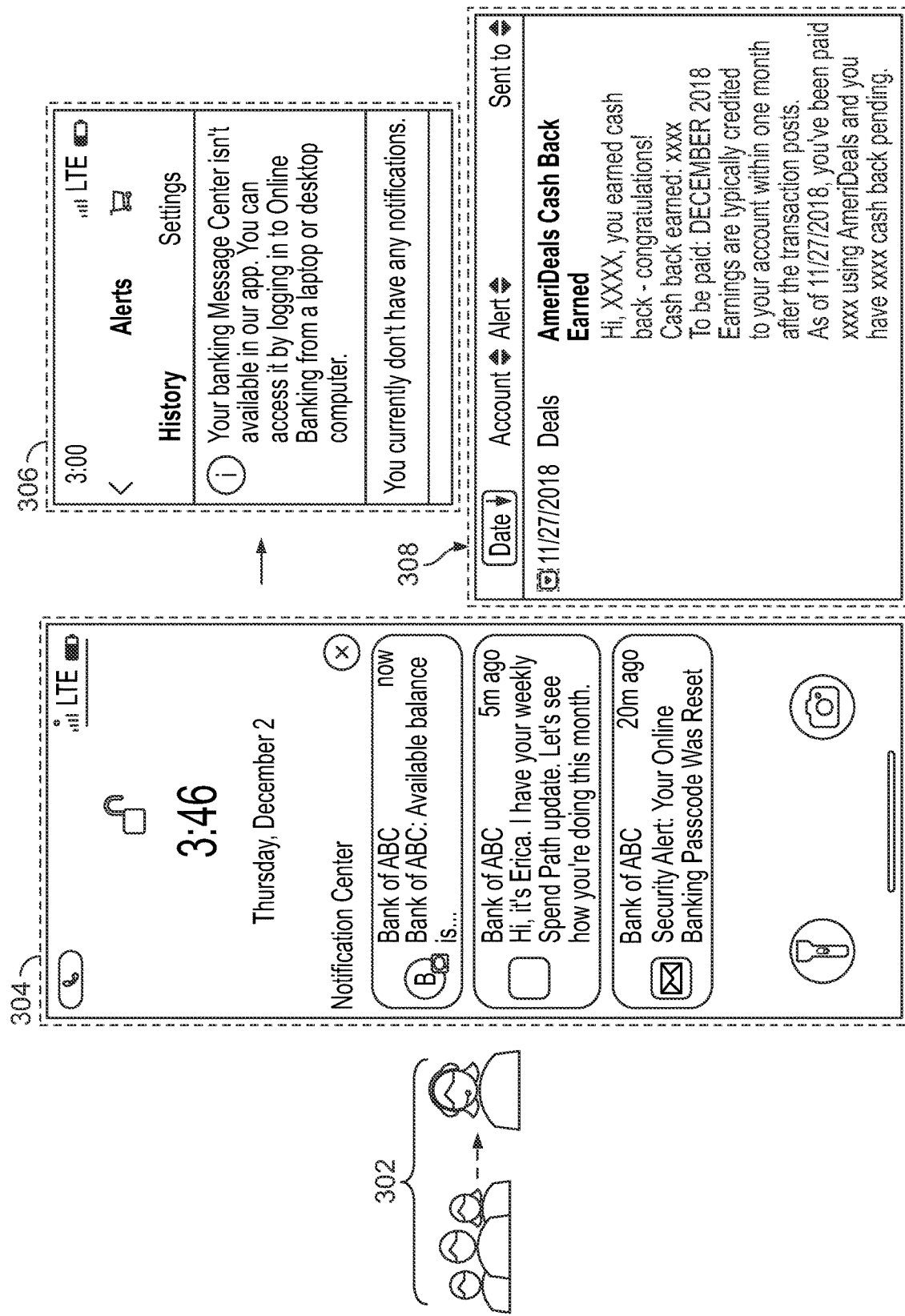
FIG. 3 shows illustrative apparatus for use together with systems and methods in accordance with the principles of the disclosure.

FIG. 3 shows illustrative apparatus for use together with systems and methods in accordance with the principles of the disclosure. FIG. 3 shows, for example, at 302, electronic communications derived from an electronic channel. Specifically, electronic communications 302 include e-chat communications between clients and an agent.

At 304, a notification page (center) is shown. The notifications listed therein include notifications that may have been system-determined or client-selected.

At 306, user history is shown. User history 306 may include information of relevant user decisions, relevant outcomes, or other relevant decision-making information that relates to a client or other user.

At 308, an user reward indicator is presented. Any relevant, reward-related, information may be included in 308 to keep the user informed of the ongoing reward-related information in the user account.

Figure 4B:
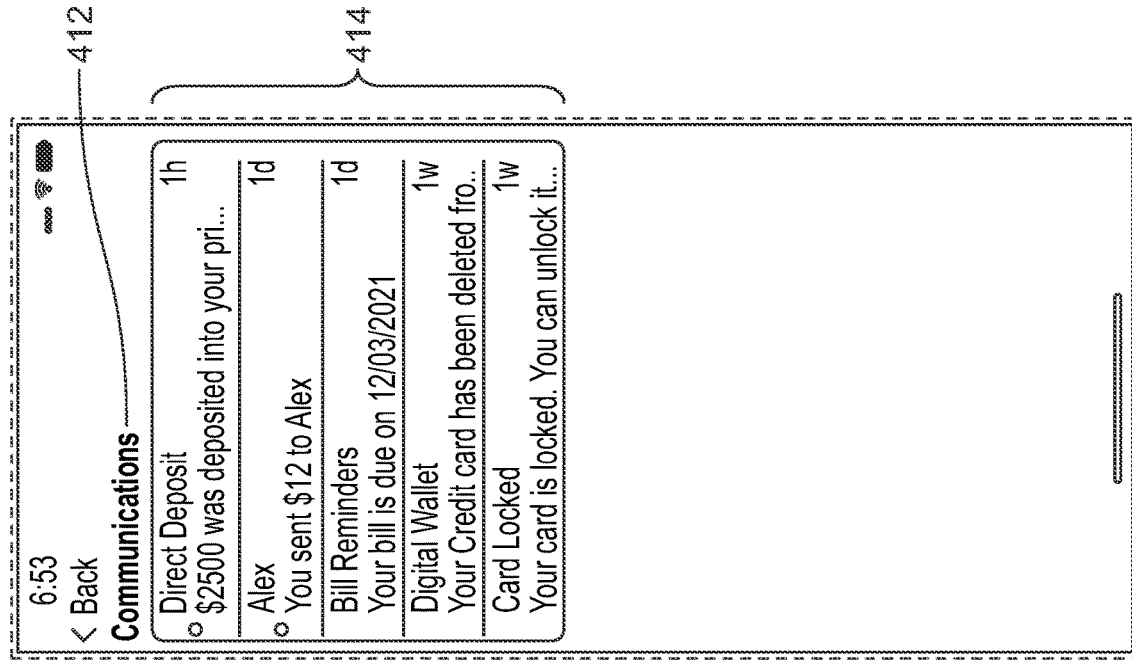
FIGS. 4A-4B show another illustrative apparatus for use together with systems and methods in accordance with the principles of the disclosure.
Figure 4A:
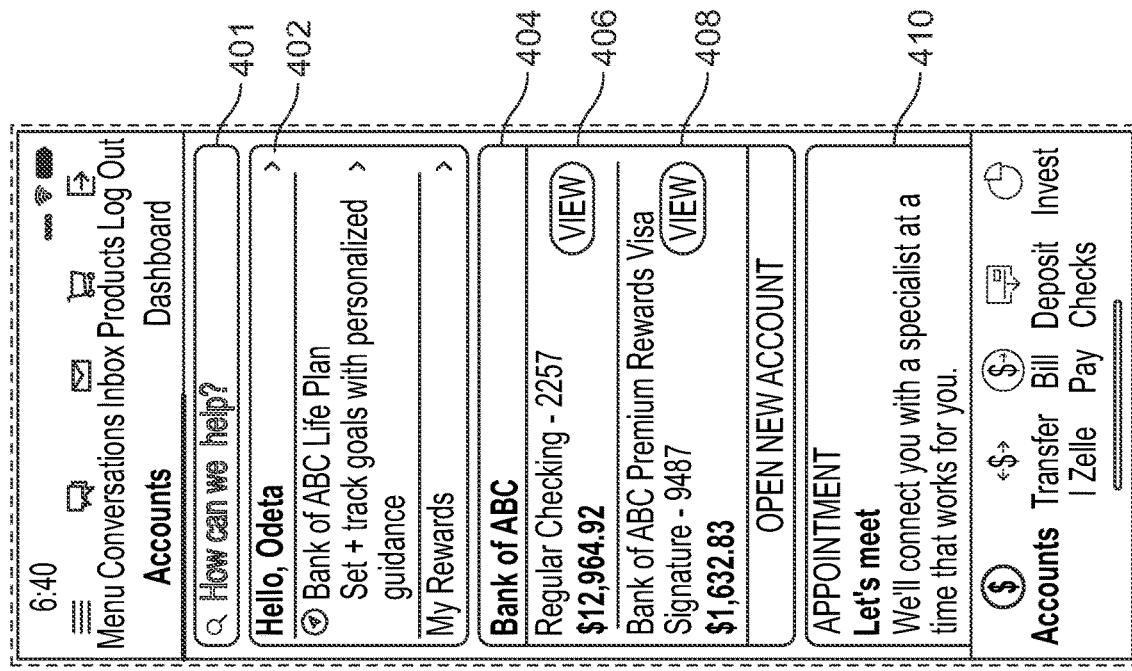

FIGS. 4A-4B show another illustrative apparatus for use together with systems and methods in accordance with the principles of the disclosure. At 402 in FIG. 4A, a mobile device face is shown. In this demonstrative figure, a search box 401 is shown. In such a box 401, a user may enter a topic of interest.

In this illustrative figure, other aspects of the mobile device face 402 may include a statement of accounts 404. Statement of accounts 404 may include, for example, a checking account balance 406 and/or a credit card balance 408.

In some embodiments, mobile device face 402 may include a scheduling widget—as shown at 410.

In a second, alternative mobile device face 412 shown in 4B, a list of current communications 414 may be shown. It should be noted, however, that communications 412 do not show a reduced or condensed communications set. Rather, all or some of current communications are shown at 414.

FIG. 5 shows yet another illustrative apparatus in accordance with the principles of the disclosure. Illustrative mobile device face 500 is shown in FIG. 5. Mobile device face 500 preferably includes various legacy transactions at 502 and 504. The two transactions 502 and 504 may preferably be distilled down from a relatively larger number of communications regarding these transactions. However, the systems and methods of the invention have been invoked to reduce the number of communications relating to the legacy transactions 502 and 504. As such, the total fields dedicated to legacy transactions 502 and 504 may be limited to a reduced number of fields. In some embodiments, the number of fields may be controlled by a user selection, or a system setting, that delimits the amount of time in which the user wishes to see transactions.

In other embodiments, the number of fields may be controlled by an overall analysis of the quantum of user information relating to the selected topic. For example, the system may analyze the quantum of user information relating to the selected topic and may determine that, in order to fit all the information on a single mobile device face 500, only two fields of legacy transactions may be invoked. It should be noted that the determination of the number of fields of legacy transactions may be determined in a dynamic sense and may be based, at least in part, on the number of options 506, 508 and 510 (collectively listed as options 512) available to the user, as well as whether the system decisions that a field associated with AI scenarios (see FIG. 6, element 605) is to be offered to the user. To reiterate, it should be noted that in certain embodiments, the AI used to determine the number of fields in mobile device face 500 may preferably also delimit the amount of fields in or more of the collections of fields in order arrange all the fields on a single mobile device face.

FIG. 6 shows still another illustrative apparatus in accordance with the principles of the disclosure. Mobile device face 600 includes legacy transaction fields 602 and 604, AI scenarios 605, and user options 612. Within user options 612 group, device face 600 includes user options 606, 608 and 610. It should be noted that, preferably the AI at work together with the systems and methods may preferably arrange all the fields set forth in FIG. 6 for display in a single mobile device face 600.

Figure 7:
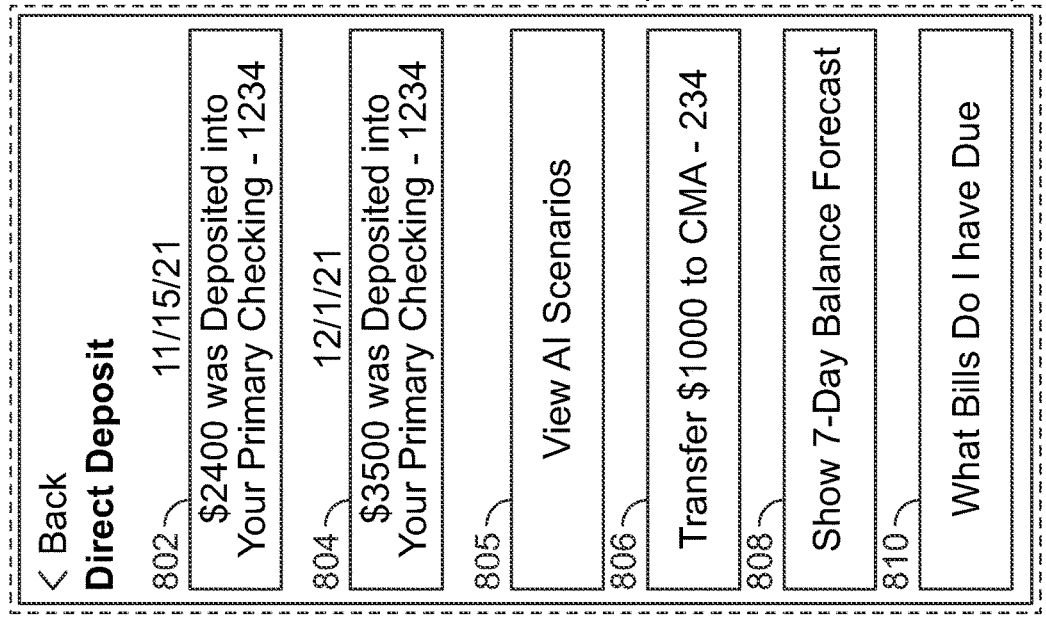
FIG. 7 shows another illustrative apparatus in accordance with the principles of the disclosure.

FIG. 7 shows another illustrative apparatus in accordance with the principles of the disclosure. Whereas FIGS. 5 and 6 show mobile device faces 500 and 600 related to a selected vendor, FIG. 7 shows a mobile device face related to a "direct deposit" account. In such an embodiment, the de-duping processing, and AI associated therewith, will be less focused on communications and distilled, instead, to focus on direct deposit history. For example, legacy fields 702 and 704 show legacy direct deposits. User options 712 shows options 706, 708 and 710 associated with transferring funds 706, balance forecasts 708 and current status of bills.

Figure 8:
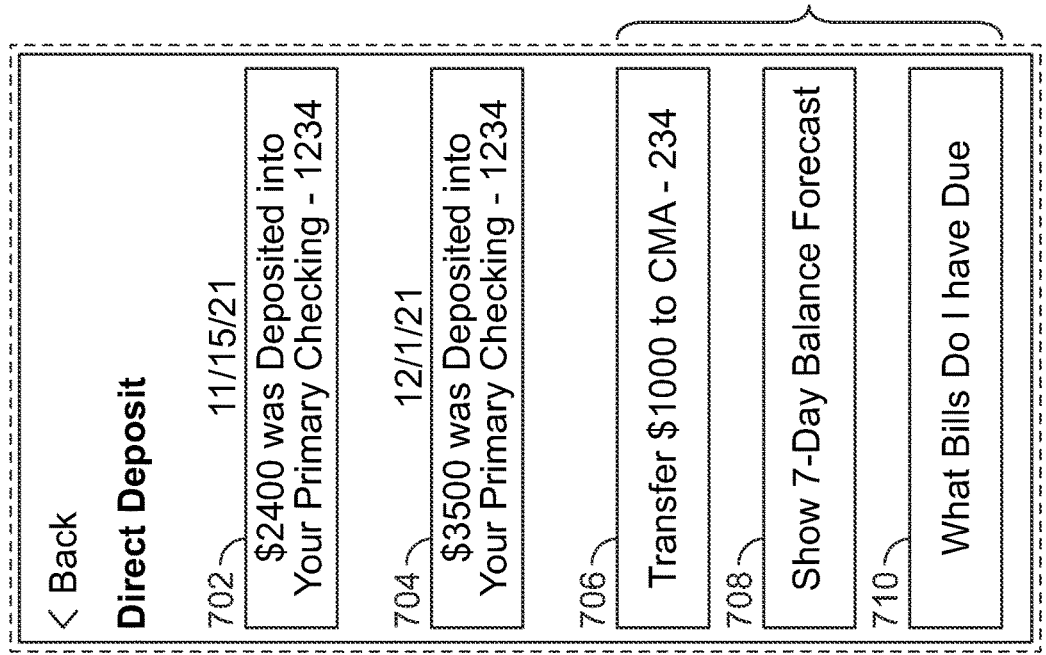
FIG. 8 shows another illustrative apparatus in accordance with the principles of the disclosure.

FIG. 8 shows another illustrative apparatus in accordance with the principles of the disclosure. Mobile device face 800 includes legacy transaction fields 802 and 804, AI scenarios 805, and user options 812. Within user options 812 group, device face 800 includes user options 806 (transfer option), 808 (balance forecast option) and 810 (current bills). It should be noted that, preferably, the AI at work together with the systems and methods may preferably arrange all the fields set forth in FIG. 8 for display in a single mobile device face 800.

Figure 9:
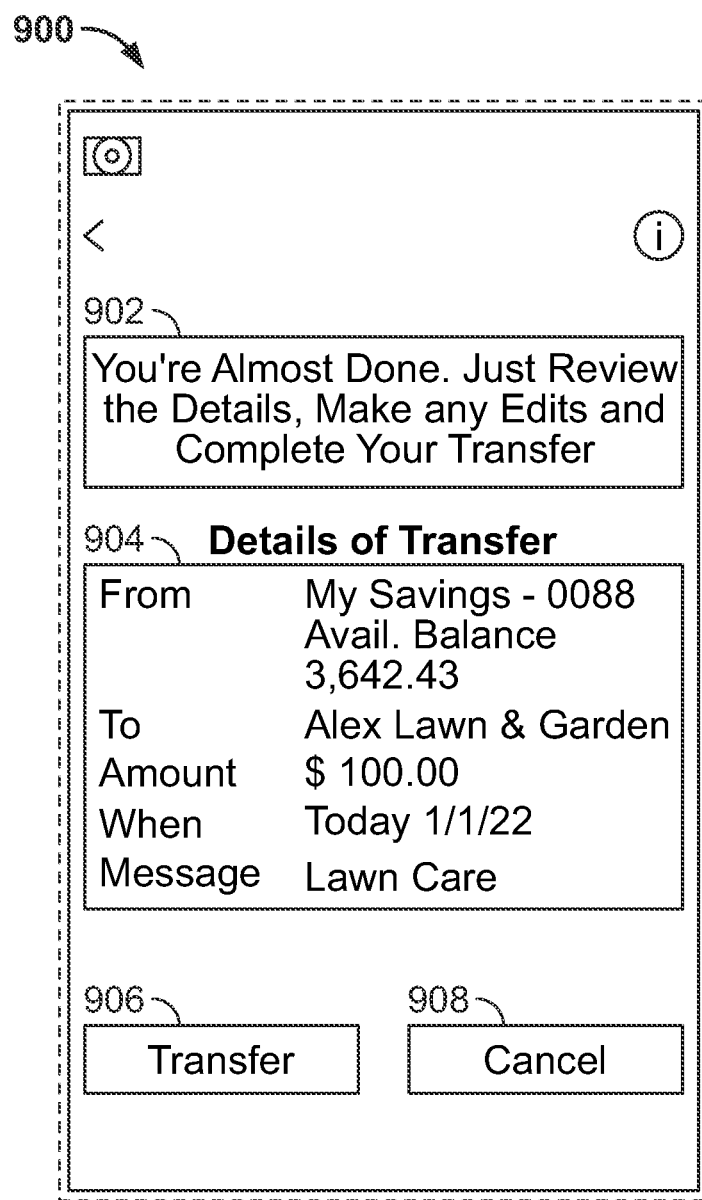
FIG. 9 shows another illustrative apparatus in accordance with the principles of the disclosure.

FIG. 9 shows another illustrative apparatus in accordance with the principles of the disclosure. In response to selection of one of options 806, 808 and 810 shown in FIG. 8, FIG. 9 shows transaction details—also preferably on a single mobile device face 900. Transaction details include review region 902 and transfer details 904. Transaction completion button 906 and transaction cancel button 908 are also shown as available on mobile device face 900.

FIG. 10 shows an illustrative flow diagram in accordance with the principles of the disclosure. At 1002, FIG. 10 shows designating a topic or receiving a user designation. At 1004, FIG. 10 shows using internal AI to de-dupe and otherwise reduce the postable entries for an efficient (preferably in a single mobile device face) display of the results obtained. Thereafter (or concurrently therewith), at 1006, FIG. 10 shows mining, using AI, possible user options for responding—if necessary—to the current state of the topic retrieved.

FIG. 11 shows another illustrative flow diagram in accordance with the principles of the disclosure. At 1102, FIG. 11 shows ordering the possible historical entries based on the various parameters such as, for example, the time of occurrence or the relative importance of the entries. At 1104, FIG. 11 shows preparing alternatives, AI-based, scenarios for presentation to the user. At 1106, FIG. 11 shows, preferably following the receipt of a user selection and/or one or more outcomes associated therewith, adjusting, or adding to, an AI-library or training set based on user selections and outcomes derived during the current session.

Figure 12:
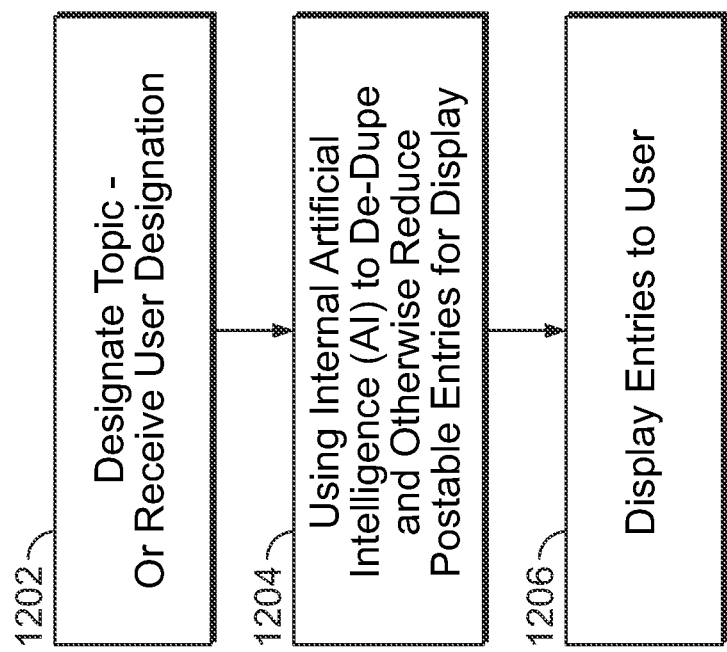
FIG. 12 shows still another illustrative flow diagram in accordance with the principles of the disclosure.

FIG. 12 shows still another illustrative flow diagram in accordance with the principles of the disclosure. At 1202, FIG. 12 shows system-designating, or receiving a user designation of, a topic for implementation of systems and methods according to the disclosure. At 1204, FIG. 12 shows using internal AI to de-dup and otherwise reduce postable entries for display. At 1206, FIG. 12 shows displaying AI-obtained entries for user display.

Figure 13:
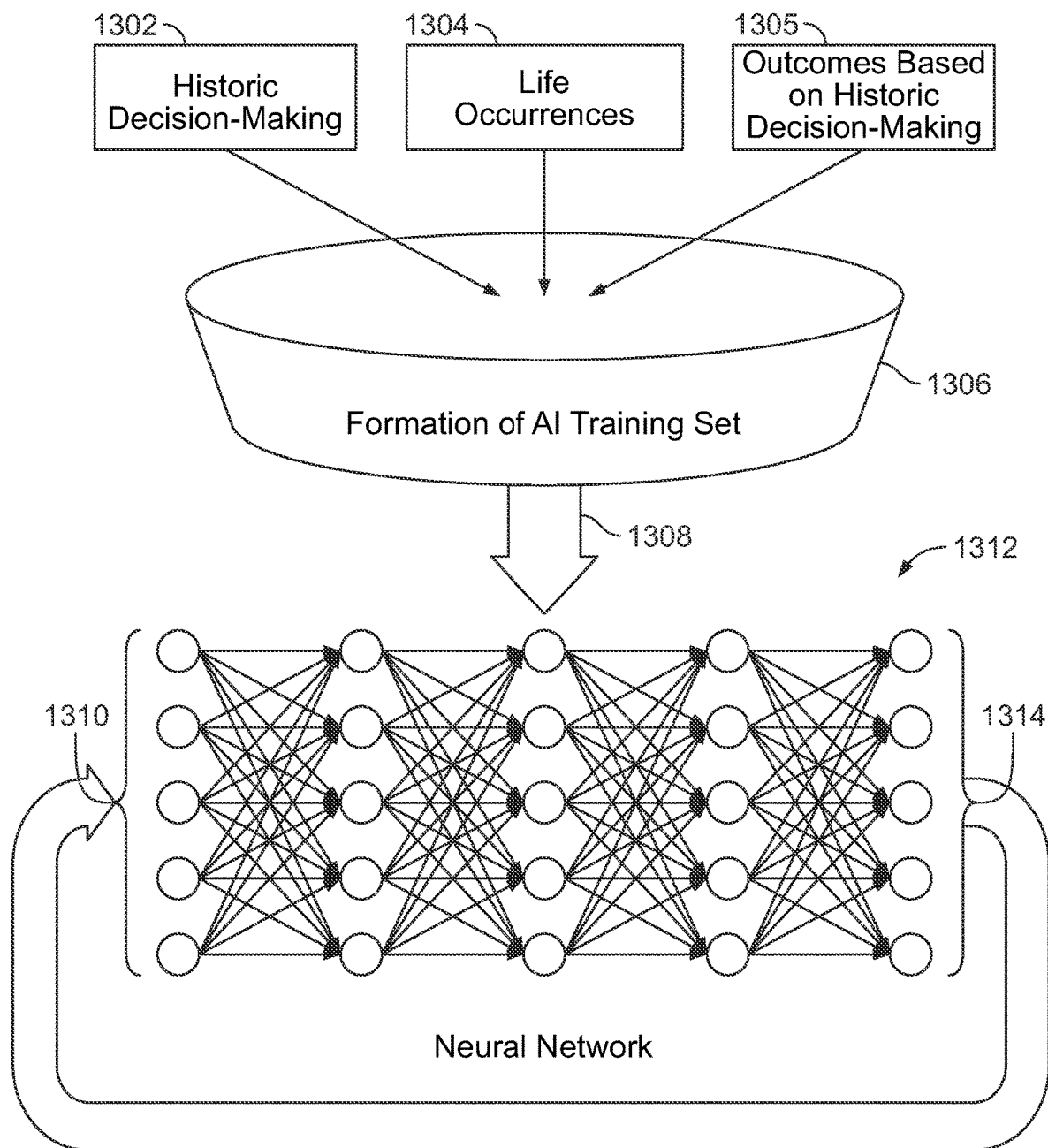
FIG. 13 shows formation of a training set and neural network in accordance with the principles of the disclosure.

FIG. 13 shows formation of a training set and neural network in accordance with the principles of the disclosure. FIG. 13 shows formation of an AI training set at 1306. Elements 1302, 1304 and 1305 represent, for example, historic decision-making, life experiences and outcomes based on historic decision-making, respectively. These three elements are used as exemplary data which is used to form the AI training set 1306.

Training set 1308 is then used, to form the neural network 1310. Neural network 1310 includes a set of nodes 1312. Nodes 1312 may then be further refined. Refinement of the neural network may typically include running computer simulations of various potential approaches and outcomes.

Figure 14A:
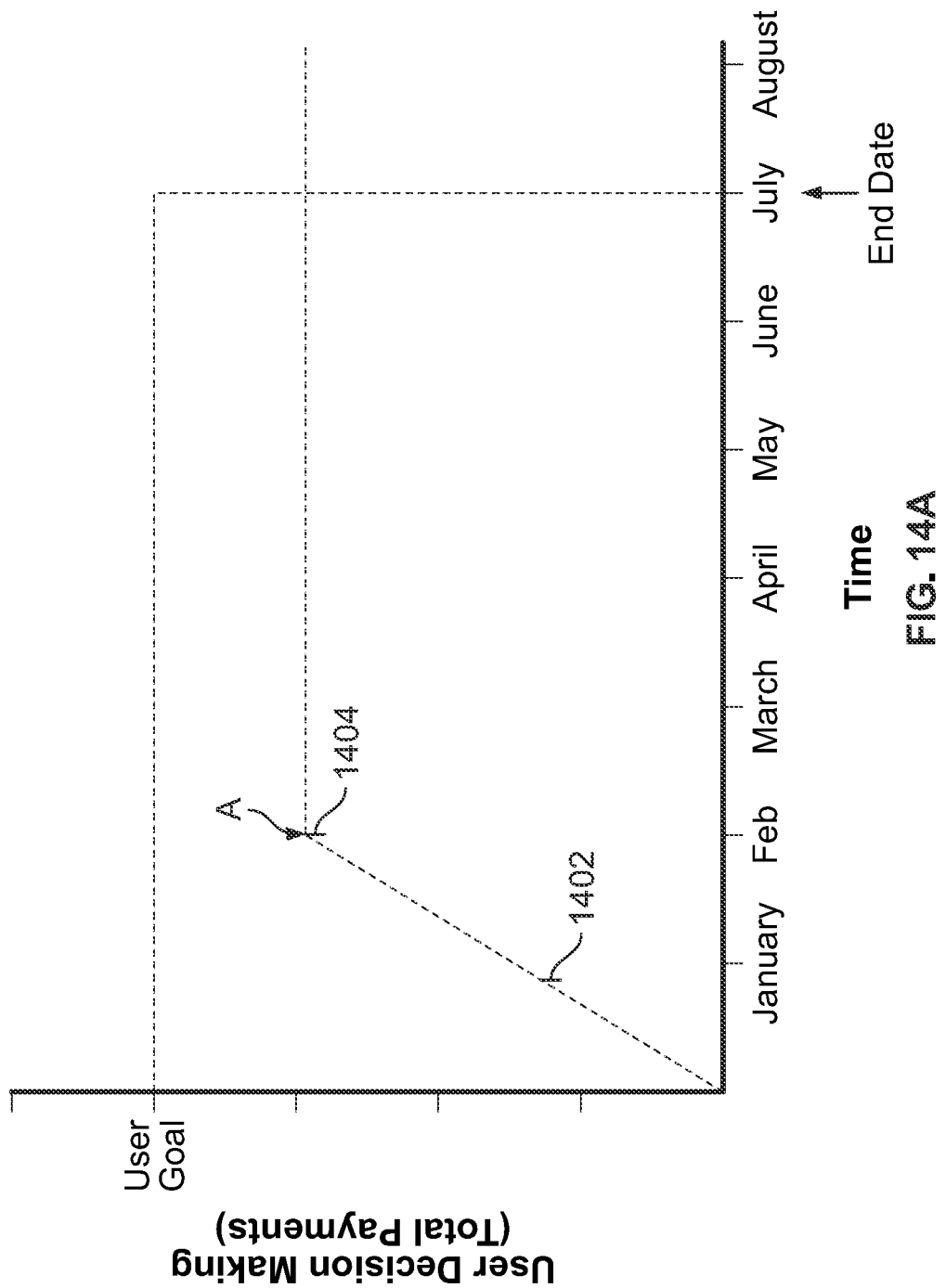
FIGS. 14A-14C shows numerous scenarios for use as part of the training set shown in FIG. 13.
Figure 14B:
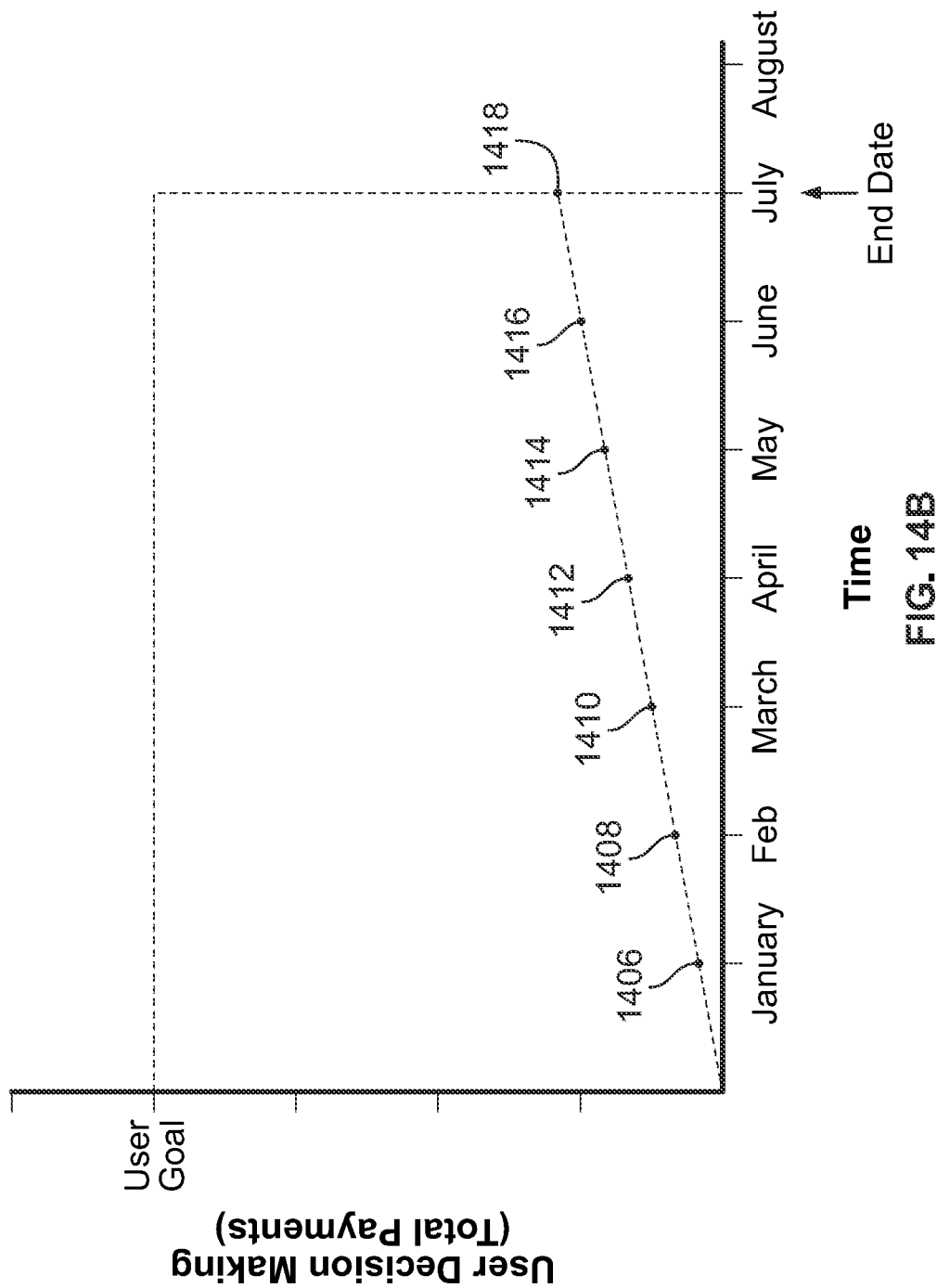
Figure 14C:
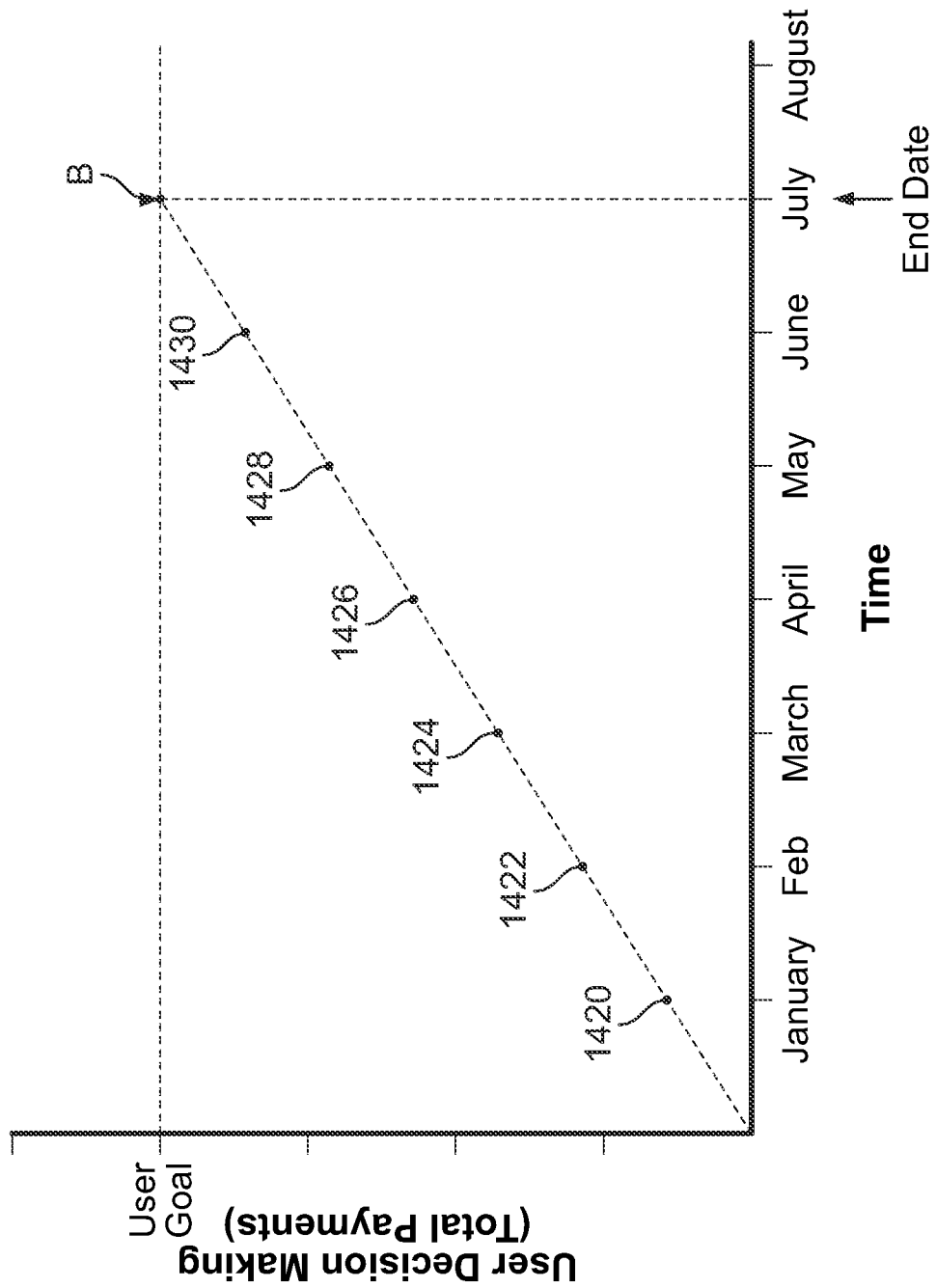

FIGS. 14A-14C show illustrative charts that indicate possible historic decision-making and historic outcomes. These historic decision-making and historic outcomes reflect, along the y-axis, the total historic payments made to the account. Time is indicated along the y-axis.

FIG. 14A shows that, in this scenario, the user selected payments that were too high and were, in fact, unsustainable by the user. This is shown at inflection point A which indicates a point in time at which the user was unable to maintain payments. It should be noted that the exact reason why the user could not maintain payments was not necessarily clear from the inputted data. Nevertheless, the inflection point could be attributable to at least one of the elements 1302 and 1304, each of which represents historic decision-making and life experiences, respectively. The failure to maintain payments may be considered an outcome based on historic decision-making, as shown at 1305 in FIG. 13. Thus, FIG. 14A shows a first scenario that could be used to form, or otherwise train, neural network 1310 shown in FIG. 13.

FIG. 14B shows that, in this scenario, the user selected payments that were too low and possibly did not achieve the desired user result in an optimum fashion. This is shown by a lack of inflection point, which indicates that the user failed to reach the user goal in the given time period. It should be noted that the exact reason why the user chose the lower payment schedule was also not necessarily clear from the inputted data. Nevertheless, the failure to reach the user goal could be attributable to at least one of the elements 1302 and 1304, each of which represents historic decision-making and life experiences, respectively. The failure to complete the user goal may be considered an outcome based on historic decision-making, as shown at 1305 in FIG. 13. Thus, FIG. 14B shows a second scenario that could be used to form, or otherwise train, neural network 1310 shown in FIG. 13.

FIG. 14C shows that, in this scenario, the user selected payments that were close to optimal in that the user completed the user goal within a pre-determined time period. This is shown at inflection point B which indicates that the user reached the user goal within a pre-determined time period. The success in maintain payments may be considered an outcome based on historic decision-making, as shown at 1305 in FIG. 13. Thus, FIG. 14C shows a first scenario that could be used to form, or otherwise train, neural network 1310 shown in FIG. 13.

In view of the scenarios 14A-14C, it can be understood that AI may be leveraged to help a user make decisions, reach goals and otherwise add efficiency to the user's behavior. Furthermore, because the AI set forth herein feeds back results to the neural network, as shown at 1314, the AI may continually improve its ability to accurately instruct a user to make highly-efficient decisions. These decisions are preferably informed by the history of the user activity and outcomes related thereto.

While AI in this application has been described as it relates to user transaction and payment activity, it should be understood that AI may also be used for fitting various collections of information to a single mobile device screen, for presenting certain options to a user, for ranking certain user options for presentation to a user or for other suitable tasks.

Thus, systems and methods for ARTIFICIAL INTELLIGENCE (AI)-POWERED LEGACY SCENARIOS FOR USE WITHIN A MOBILE APPLICATION technology are provided. Persons skilled in the art will appreciate that the present invention can be practiced by other than the described embodiments, which are presented for purposes of illustration rather than of limitation. The present invention is limited only by the claims that follow.

What is claimed is:
1. A method for condensing user communications relating to a first topic, the method for use with a system, the system comprising a processor and a non-transitory memory with instructions stored thereon, wherein the instructions upon execution by the processor, cause the processor to execute the method, said method comprising:
designating a topic of user interest;
retrieving legacy communications regarding the topic;
determining whether duplicative communications are included among the legacy communications and, to the extent that duplicative communications are included in the legacy communications, removing said duplicative communications from the legacy communications;
retrieving legacy intelligence relating to historical user selections regarding the topic;
retrieving a plurality of outcomes based on the legacy intelligence;
with respect to the topic of interest, forming a topic-centric training set for a neural network, said topic-centric training set being based on the legacy communications, legacy intelligence, and the plurality of outcomes, said topic-centric training set being delimited by an analysis of the database, said neural network comprising a plurality of nodes;
synthesizing the neural network, said synthesizing using the topic-centric training set to assign individual weights to each of the plurality of nodes based on the legacy communications, legacy intelligence, and the plurality of outcomes;

in response to a selection of the topic of user interest, generating, for display to a user, and displaying a plurality of topic-related user options based on the neural network;
prompting the user to select a scenario indicator in which a plurality of artificial intelligence (AI)-based scenarios are displayed;
displaying the plurality of AI-based scenarios, each of the plurality of scenarios that corresponds to a single one of the plurality of user options;
prompting the user to select one of the scenarios; and
in response to the user selecting one of the scenarios triggering the option that corresponds to the selected scenario;
wherein each of said plurality of outcomes incorporates results of legacy user selections regarding the topic of user interest.

2. The method of claim 1, the generating further comprises generating each of the plurality of user options with a priority score associated therewith.

3. The method of claim 2 further comprising ranking and displaying the plurality of user options to the user, the ranking being based on the priority score.

4. The method of claim 1, further comprising leveraging AI-based spatial information to determine a quantity and size of the plurality of topic-related user options for display such that a total display to the user does not occupy more than a single mobile device face.

5. The method of claim 1, further comprising leveraging AI-based spatial information to determine a quantity of the plurality of topic-related user options for display such that a total display to the user does not occupy more than a single mobile device face.

6. The method of claim 1, wherein the analysis of the database comprises deriving a pre-determined number of topics of interest upon which to base the topic-centric training set, said deriving comprises reducing the topics of interest found in the database to a pre-determined number of most-occurring topics of interest.

7. A system for condensing user communications relating to a first topic, the system comprising:
a processor and a non-transitory memory with instructions stored thereon, the memory comprising a database, wherein the instructions upon execution by the processor, the processor configured to:
designate a topic of user interest;
retrieve legacy communications regarding the topic of user interest;
determine whether duplicative communications are included in the legacy communications and, to the extent that duplicative communications are included in the legacy communications, removing said duplicative communications from the retrieved legacy communications;
retrieve legacy intelligence relating to a plurality of user selections regarding the topic of user interest;
retrieve a plurality of outcomes based on the legacy intelligence;
with respect to the topic of interest, form a topic-centric training set for a neural network, said topic-centric training set being based on the legacy communications, legacy intelligence, and the plurality of outcomes, said topic-centric training set being delimited by an analysis of the database, said neural network comprising a plurality of nodes;
synthesize the neural network using the topic-centric training set in order to assign individual weights to each of the plurality of nodes based on the legacy communications, legacy intelligence, and the plurality of outcomes;
in response to a selection of the topic of user interest, generate, for display to a user, and displaying a plurality of topic-related user options based on the neural network;
prompt the user to select a scenario indicator in which a plurality of artificial intelligence (AI)-based scenarios are displayed;
display the plurality of AI-based scenarios, each of the plurality of scenarios that corresponds to a single one of the plurality of user options;
prompt the user to select one of the scenarios; and
in response to the user selecting one of the scenarios trigger the option that corresponds to the selected scenario;
wherein each of said plurality of outcomes incorporates results of legacy user selections regarding the topic of user interest.

8. The system of claim 7, the generating further comprises generating each of the plurality of user options with a priority score associated therewith.

9. The system of claim 8 further comprising ranking and displaying the plurality of user options to the user, the ranking being based on the priority score.

10. The method of claim 7, further comprising leveraging AI-based spatial information to determine a quantity and size of the plurality of topic-related user options for display such that a total display to the user does not populate more than a single mobile device face.

11. The method of claim 7, further comprising leveraging AI-based spatial information to determine a quantity of the plurality of topic-related user options for display such that a total display to the user does not populate more than a single mobile device face.

12. The system of claim 7, wherein the analysis of the database comprises deriving a pre-determined number of topics of user interest upon which to base the topic-centric training set, said deriving comprising reducing the topics of user interest found in the database to a pre-determined number of most-occurring topics of user interest.

13. A method for condensing user communications relating to a first topic, the method for use with a system, the system comprising a processor and a non-transitory memory with instructions stored thereon, wherein the instructions upon execution by the processor, cause the processor to execute the method, said method comprising:
receiving a user designation of a topic of user interest;
in real-time, retrieving legacy communications regarding the topic;
in real-time, determining whether duplicative communications are included among the legacy communications and, to the extent that duplicative communications are included in the legacy communications, removing said duplicative communications from the legacy communications;
in real-time, retrieving legacy intelligence relating to historical user selections regarding the topic;
in real-time, retrieving a plurality of outcomes based on the legacy intelligence;
with respect to the topic of interest, forming, in real-time, a topic-centric training set for a neural network, said topic-centric training set being based on the legacy communications, legacy intelligence, and the plurality of outcomes, said neural network comprising a plurality of nodes;

synthesizing the neural network, said synthesizing using the topic-centric training set to assign individual weights to each of the plurality of nodes based on the legacy communications, legacy intelligence, and the plurality of outcomes;

in response to a selection of the topic of user interest, generating, for display to a user, and displaying a plurality of topic-related user options based on the neural network;

prompting the user to select a scenario indicator in which a plurality of artificial intelligence (AI)-based scenarios are displayed;

displaying the plurality of AI-based scenarios, each of the plurality of scenarios that corresponds to a single one of the plurality of user options;

prompting the user to select one of the scenarios; and in response to the user selecting one of the scenarios triggering the option that corresponds to the selected scenario;

wherein each of said plurality of outcomes incorporates results of legacy user selections regarding the topic of user interest.

14. The method of claim 13, the generating further comprises generating each of the plurality of user options with a priority score associated therewith.

15. The method of claim 14 further comprising ranking and displaying, the ranking and displaying occurring in real-time, the plurality of user options to the user, the ranking being based on the priority score.

16. The method of claim 13, further comprising leveraging AI-based spatial information to determine a quantity and size of the plurality of topic-related user options for display such that a total display to the user does not occupy more than a single mobile device face.

17. The method of claim 13, further comprising leveraging AI-based spatial information to determine a quantity of the plurality of topic-related user options for display such that a total display to the user does not occupy more than a single mobile device face.

* * * * *